United States Patent
Zhao

(10) Patent No.: US 10,948,752 B2
(45) Date of Patent: Mar. 16, 2021

(54) DISPLAY PANEL AND DISPLAY APPARATUS

(71) Applicants: HKC Corporation Limited, Shenzhen (CN); Chongqing HKC Optoelectronics Technology Co., Ltd., Chongqing (CN)

(72) Inventor: Xuewen Zhao, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

(*) Notice: Subject to any disclaimer, the term of this patent is extended or adjusted under 35 U.S.C. 154(b) by 16 days.

(21) Appl. No.: 16/349,618

(22) PCT Filed: May 10, 2017

(86) PCT No.: PCT/CN2017/083785
§ 371 (c)(1),
(2) Date: May 14, 2019

(87) PCT Pub. No.: WO2018/120579
PCT Pub. Date: Jul. 5, 2018

(65) Prior Publication Data
US 2019/0377208 A1 Dec. 12, 2019

(30) Foreign Application Priority Data

Dec. 29, 2016 (CN) .......................... 201611241716.6

(51) Int. Cl.
*G02F 1/1333* (2006.01)
*G02F 1/1339* (2006.01)
*G02F 1/1368* (2006.01)

(52) U.S. Cl.
CPC .......... *G02F 1/1333* (2013.01); *G02F 1/1339* (2013.01); *G02F 1/133305* (2013.01);
(Continued)

(58) Field of Classification Search
CPC ............. G02F 1/1333; G02F 1/133305; G02F 1/1339; G02F 1/1368; G02F 2001/133302;
(Continued)

(56) References Cited

U.S. PATENT DOCUMENTS 9,164,324 B2 * 10/2015 Son .................. G02F 1/1337
2001/0033358 A1 10/2001 Matsumoto
(Continued)

FOREIGN PATENT DOCUMENTS

CN 101089689 A 12/2007
CN 201029013 Y 2/2008
(Continued)

OTHER PUBLICATIONS

Yuanfeng Fang, the ISA written comments, Aug. 2017, CN.
Yuanfeng Fang, the International Search Report, dated Aug. 2017, CN.

*Primary Examiner* — Charles S Chang

(57) ABSTRACT

The present application discloses a display panel and a display apparatus. The display panel includes a first substrate including a first buckle portion, and a second substrate arranged opposite to the first substrate, where a second buckle portion matched with the first buckle portion in a buckle manner is disposed on the second substrate.

20 Claims, 5 Drawing Sheets

(52) U.S. Cl.
CPC ............. *G02F 1/1368* (2013.01); *G02F 2001/133302* (2013.01); *G02F 2001/133354* (2013.01); *G02F 2001/133388* (2013.01); *G02F 2201/56* (2013.01)

(58) Field of Classification Search
CPC ........ G02F 2001/133354; G02F 2001/133388; G02F 2201/56
USPC ....................................................... 349/158
See application file for complete search history.

(56) References Cited

U.S. PATENT DOCUMENTS

| | | | | |
|---|---|---|---|---|
| 2007/0173167 | A1* | 7/2007 | Choi | H01L 51/5246 |
| | | | | 445/25 |
| 2016/0254482 | A1* | 9/2016 | Wang | H01L 51/5246 |
| | | | | 257/88 |

FOREIGN PATENT DOCUMENTS

| | | | |
|---|---|---|---|
| CN | 101726913 | A | 6/2010 |
| CN | 202563208 | U | 11/2011 |
| CN | 203433222 | U | 2/2014 |
| CN | 104516155 | A | 4/2015 |
| JP | 2008261936 | A | 10/2008 |

\* cited by examiner

DISPLAY PANEL AND DISPLAY APPARATUS

The present application claims priority to Chinese Patent Application No. CN2016112417166, filed with the Chinese Patent Office on Dec. 29 2016, and entitled "DISPLAY PANEL AND DISPLAY APPARATUS", which is incorporated herein by reference in its entirety.

TECHNICAL FIELD

The present application relates to the technical field of displays, and in particular relates to a display panel and a display apparatus.

BACKGROUND

The descriptions herein provide only background information related to the present application, and do not necessarily constitute the prior art.

Display apparatuses have numerous advantages, such as a thin body, power saving, no radiation, and are widely used. Most display apparatuses in the market are backlit display apparatuses, each including a display panel and a backlight module. Working principle of the display panel is that liquid crystals are put in two parallel substrates, and a driving voltage is applied to the two substrates to control a rotational direction of the liquid crystals, to refract light rays of the backlight module to generate a picture.

Thin film transistor liquid crystal display apparatuses (TFT-LCD) currently maintain a leading status in the display field because of low power consumption, excellent picture quality, high production yield, and other properties. Similarly the TFT-LCD apparatus includes a display panel and a backlight module. The display panel includes a color filter substrate (CF substrate), a thin film transistor substrate (TFT substrate) and transparent electrodes on relative inner sides of the above substrates. A layer of liquid crystals (LC) is positioned between two substrates. The display panel changes a polarized state of light by controlling the direction of the LCs through an electric field, for penetration and obstruction of a light path via a polarized plate to display.

The CF substrate and the TFT substrate may have position deviation before a sealant is cured, causing light leakage or scrapping and other bad conditions of the panel after assembling via an assembly machine in a panel manufacturing process.

SUMMARY

The present application provides a display panel and a display apparatus to prevent positions of a CF substrate and a TFT substrate from deviating.

The purpose of the present application is achieved by the following technical solution. A display panel includes: a first substrate including a first buckle portion, and a second substrate arranged opposite to the first substrate and provided with a second buckle portion matched with the first buckle portion in a buckle manner.

Optionally, the first marks are arranged around the first buckle portion. Second marks are arranged around the second buckle portion.

Optionally, the first buckle portion includes a first groove. The second buckle portion includes a first protrusion matched with the first groove in the buckle manner.

Optionally, the depth of the first groove is greater than height of the first protrusion.

Optionally, the first groove includes a first sub-groove and a second sub-groove. The first sub-groove is perpendicularly connected to the second sub-groove. The first protrusion includes a first sub-protrusion and a second sub-protrusion matched with the first sub-groove and the second sub-groove in the buckle manner.

Optionally, the first groove includes the first sub-groove, the second sub-groove, a third sub-groove and a fourth sub-groove connected in sequence. The first sub-groove is connected to the fourth sub-groove. The first sub-groove is parallel to the third sub-groove. The second sub-groove is parallel to the fourth sub-groove. The first protrusion includes the first sub-protrusion matched with the first sub-groove, the second sub-protrusion matched with the second sub-groove, a third sub-protrusion matched with the third sub-groove and a fourth sub-protrusion matched with the fourth sub-groove in the buckle manner.

Optionally, the first groove includes an annular sub-groove. The first protrusion includes an annular sub-protrusion matched with the annular sub-groove in the buckle manner.

Optionally, the first buckle portion includes a plurality of first sub-buckle portions. The plurality of first sub-buckle portions are spacedly disposed on the non-display region of the first substrate. The second buckle portion includes a plurality of second sub-buckle portions. The plurality of second sub-buckle portions corresponding to the first sub-buckle portions are spacedly disposed on the second substrate.

Optionally, the first buckle portion is disposed on a side edge of the first substrate. The second buckle portion corresponding to the first buckle portion is disposed on the side edge of the second substrate.

Optionally, the first buckle portion includes the first groove. The second buckle portion includes the first protrusion matched with the first groove in the buckle manner. The first buckle portion further includes the second protrusion. The second buckle portion includes the second groove matched with the second protrusion in the buckle manner.

Optionally, the first substrate is an array substrate, and the second substrate is a color film substrate.

Optionally, the material of the first substrate and the second substrate is glass or plastic.

The present application also discloses a display apparatus including the above display panel.

Compared with the scheme without a buckle device, the technical effect of the present application is as follows: the first buckle portion and the second buckle portion matched in the buckle manner are disposed on the first substrate and the second substrate. Since the first buckle portion and the second buckle portion can be matched in the buckle manner, the first substrate and the second substrate are prevented from being displaced in an assembling process of an assembly machine in a panel manufacturing process, thereby preventing the panel from leaking light or scrapping and other bad conditions, improving the yield of the panel, and reducing the production costs. The first buckle portion and the second buckle portion are arranged, preventing the first substrate and the second substrate from being displaced after assembling without increasing cost in the manufacturing process.

DETAILED DESCRIPTION

Specific structure and function details disclosed herein are only representative and are used for the purpose of describing exemplary embodiments of the present application. However, the present application may be specifically achieved in many alternative forms and shall not be interpreted to be only limited to the embodiments described herein.

It should be understood in the description of the present application that terms such as "central", "horizontal", "upper", "lower", "left", "right", "vertical", "horizontal", "top", "bottom", "inner", "outer", etc. indicate direction or position relationships shown based on the drawings, and are only intended to facilitate the description of the present application and the simplification of the description rather than to indicate or imply that the indicated device or element must have a specific direction or constructed and operated in a specific direction, and therefore, shall not be understood as a limitation to the present application. In addition, the terms such as "first" and "second" are only used for the purpose of description, rather than being understood to indicate or imply relative importance or hint the number of indicated technical features. Thus, the feature limited by "first" and "second" may explicitly or impliedly include one or more features. In the description of the present application, the meaning of "a plurality of" is two or more unless otherwise specified. In addition, the term "comprise" and any variant are intended to cover non-exclusive inclusion.

It should be noted in the description of the present application that, unless otherwise specifically regulated and defined, terms such as "installation," "bonded," and "bonding" shall be understood in broad sense, and for example, may refer to fixed bonding or detachable bonding or integral bonding; may refer to mechanical bonding or electrical bonding; and may refer to direct bonding or indirect bonding through an intermediate medium or inner connection of two elements. For those of ordinary skill in the art, the meanings of the above terms in the present application may be understood according to concrete conditions.

The terms used herein are intended to merely describe concrete embodiments, not to limit the exemplary embodiments. Unless otherwise noted clearly in the context, singular forms "one" and "single" used herein are also intended to comprise plurals. It should also be understood that the terms "comprise" and/or "include" used herein specify the existence of stated features, integers, steps, operation, units and/or assemblies, not excluding the existence or addition of one or more other features, integers, steps, operation, units, assemblies and/or combinations of these.

The present application will be further described in detail below in combination with the drawings and preferred embodiments.

The display panel according to embodiments of the present application will be described below by reference to FIG. 1 to FIG. 10.

Figure 1:
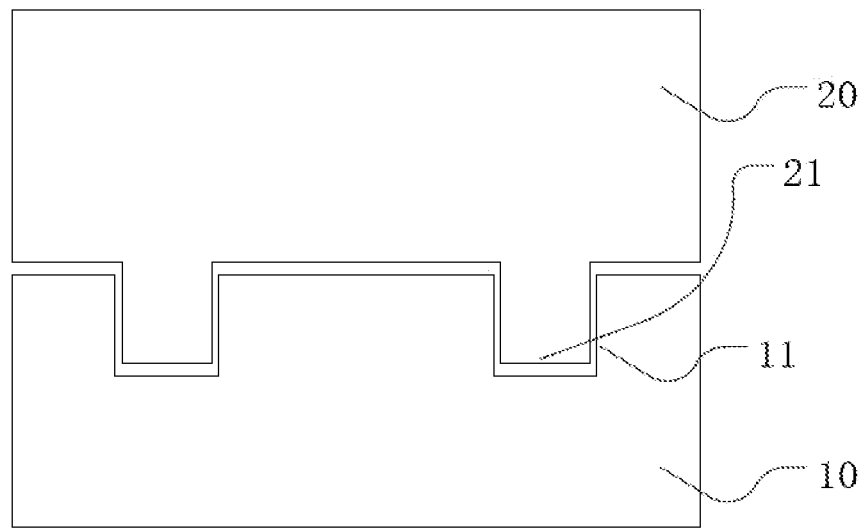
FIG. 1 is a contraposition cross-sectional view of a first buckle portion and a second buckle portion after combination of a first substrate and a second substrate according to an embodiment of the present application.
Figure 10:
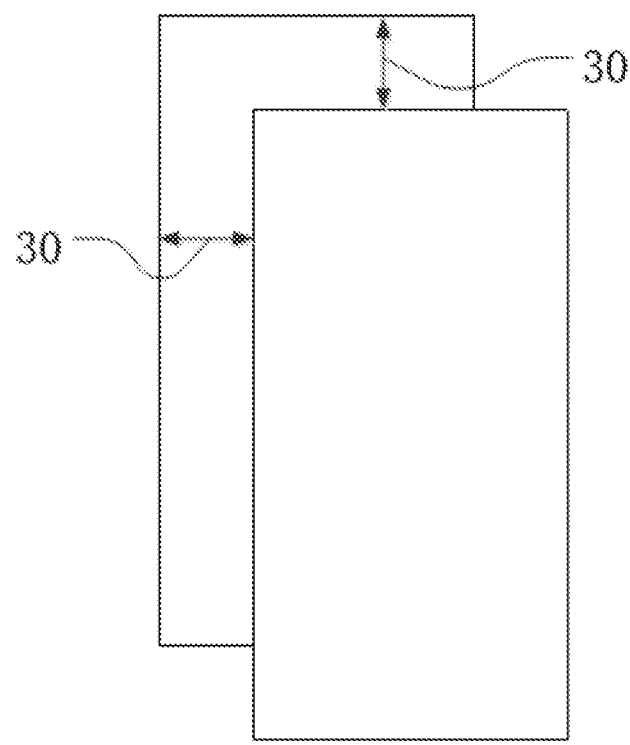
FIG. 10 is a schematic diagram of pixel having no coincidence region according to an embodiment of the present application.

As shown in FIG. 1, the display panel in the embodiment of FIG. 1 includes a first substrate 10 including a first buckle portion 11, and a second substrate 20 arranged opposite to the first substrate 10, where a second buckle portion 21 matched with the first buckle portion 11 in a buckle manner is disposed on the second substrate. The first buckle portion 11 matched in the buckle manner is disposed on the first substrate 10 and the second buckle portion 21 matched in the buckle manner is disposed on the second substrate 20. Since the first buckle portion 11 and the second buckle portion 21 can be matched with each other in the buckle manner, the first substrate 10 and the second substrate 20 can be prevented from being displaced in an assembling process of an assembly machine in a panel manufacturing process, thereby preventing the panel from leaking light or scrapping and other bad conditions, improving the yield of the panel, and reducing the production costs. The first buckle portion 11 and the second buckle portion 21 are arranged, preventing the first substrate 10 and the second substrate 20 from being displaced after assembling without increasing costs in the manufacturing process. As shown in FIG. 10, the first substrate 10 and the second substrate 20 are subjected to position deviation before a sealant is cured, causing light leakage or scrapping and other bad conditions of the panel after assembling via an assembly machine in the panel manufacturing process. The Pixel does not have a coincidence region 30 to leak light. The first buckle portion 11 and the second buckle portion 21 for preventing positions from deviation reduce or avoid the occurrence of the problem points after assembling, can reduce problems of light leakage and failure, and can maintain optical performance requirements. The number and the positions of the first buckle portions 11 and the second buckle portions 21 can be designed according to demands of the first substrate 10 and the second substrate 20.

Figure 2:
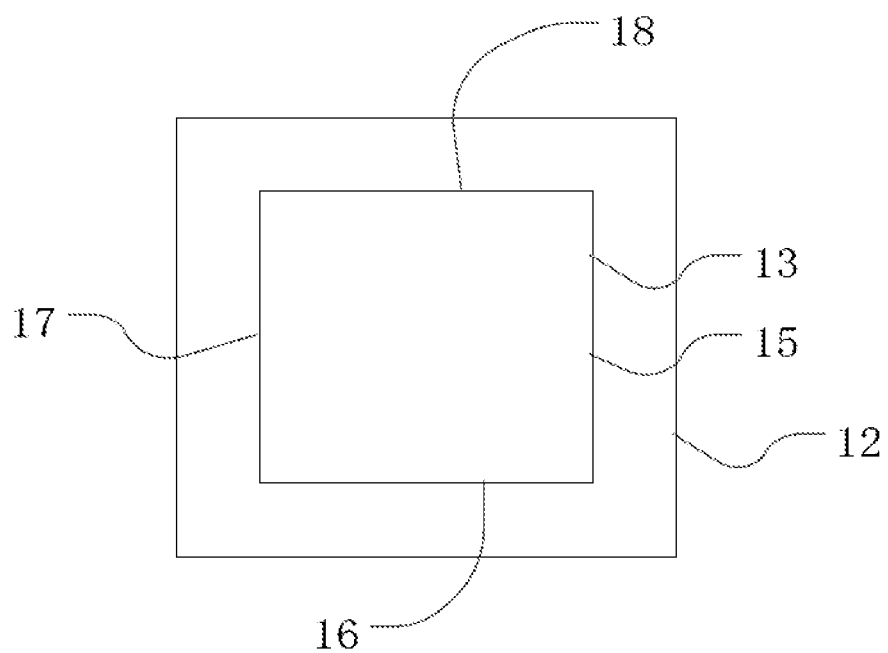
FIG. 2 is a schematic diagram of a first buckle portion and a first mark according to an embodiment of the present application.
Figure 3:
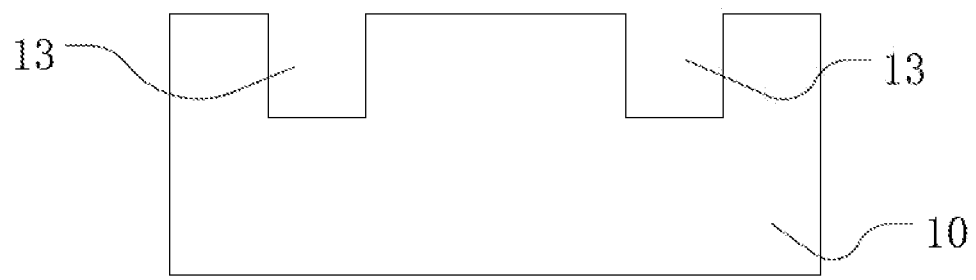
FIG. 3 is a schematic cross-sectional view of FIG. 2 according to an embodiment of the present application.
Figure 4:
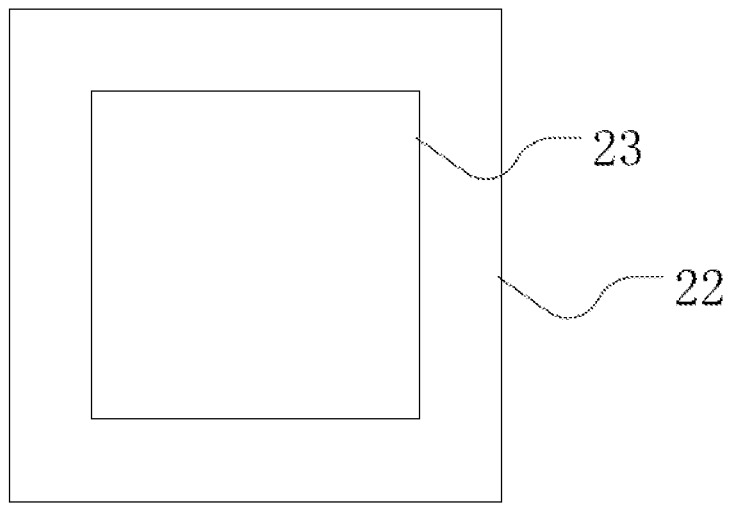
FIG. 4 is a schematic diagram of a second buckle portion and a second mark according to an embodiment of the present application.
Figure 5:
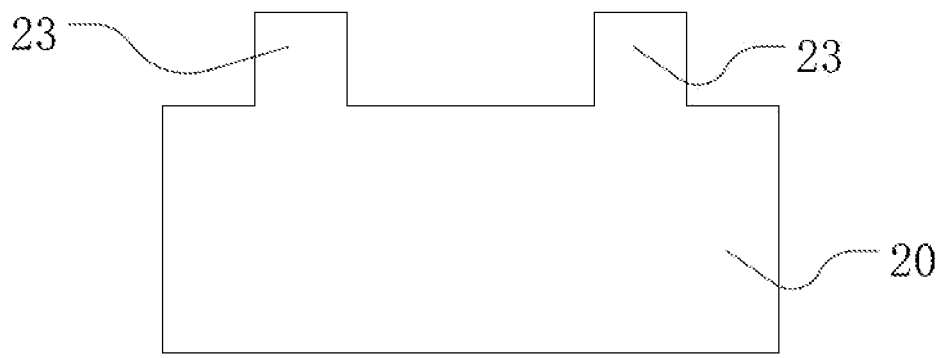
FIG. 5 is a schematic cross-sectional view of FIG. 4 according to an embodiment of the present application.

As shown in FIG. 1, FIG. 2 and FIG. 4, the display panel in the embodiments of FIG. 1, FIG. 2 and FIG. 4 includes a first substrate 10 including a first buckle portion 11, and a second substrate 20 arranged opposite to the first substrate 10, and a second buckle portion 21 matched with the first buckle portion 11 in a buckle manner is disposed on the second substrate 20. The first buckle portion 11 matched in the buckle manner is disposed on the first substrate 10 and the second buckle portion 21 matched in the buckle manner is disposed on the second substrate 20. Since the first buckle portion 11 and the second buckle portion 21 may be matched with each other in the buckle manner, the first substrate 10 and the second substrate 20 can be prevented from being displaced in the assembling process of the assembly machine in the panel manufacturing process, thereby preventing the panel from leaking light or scrapping and other bad conditions, improving the yield of the panel, and reducing the production cost. The first buckle portion 11 and the second buckle portion 21 are arranged, preventing the first substrate 10 and the second substrate 20 from being displaced after assembling without increasing costs in the manufacturing process.

In one or more embodiments, first marks 12 are arranged around the first buckle portion 11. Second marks 22 are arranged around the second buckle portion 21. The first marks 12 and the second marks 22 are arranged around the first buckle portion 11 and the second buckle portion 21. The amount of deformation of the first substrate 10 and the second substrate 20 in a former factory can be monitored via the first marks 12 and the second marks 22, thereby facilitating to add and correct the manufacturing process.

As shown in FIG. 1 to FIG. 5, the display panel in the condiments of FIG. 1 to FIG. 5 includes a first substrate 10 including a first buckle portion 11, and a second substrate 20 arranged opposite to the first substrate 10, and a second buckle portion 21 matched with the first buckle portion 11 in a buckle manner is disposed on the second substrate. The first buckle portion 11 and the second buckle portion 21 matched in the buckle manner, are disposed on the first substrate 10 and the second substrate 20. Since the first buckle portion 11 and the second buckle portion 21 can be matched with each other in the buckle manner, the first substrate 10 and the second substrate 20 can be prevented from being displaced in the assembling process of the assembly machine in the panel manufacturing process, thereby preventing the panel from leaking light or scrapping and other bad conditions, improving the yield of the panel, and reducing the production costs. The first buckle portion 11 and the second buckle portion 21 are arranged, preventing the first substrate 10 and the second substrate 20 from being displaced after assembling without increasing costs in the manufacturing process.

In one or more embodiments, first marks 12 are arranged around the first buckle portion 11. Second marks 22 are arranged around the second buckle portion 21. The first marks 12 and the second marks 22 are arranged around the first buckle portion 11 and the second buckle portion 21. The amount of deformation of the first substrate 10 and the second substrate 20 in a former factory can be monitored via the first marks 12 and the second marks 22, thereby facilitating to add and correct the manufacturing process.

In one or more embodiments, the first buckle portion 11 includes a first groove 13. The second buckle portion 21 includes a first protrusion 23 matched with the first groove 13 in the buckle manner. The first groove 13 is easily matched and fixed with the first protrusion 23 in the buckle manner, and change in the substrate 10 and the second substrate 20 is small.

In one or more embodiments, the depth of the first groove 13 is greater than height of the first protrusion 23. The depth of the first groove 13 is greater than the height of the first protrusion forming buckle through matching.

In one or more embodiments, the first groove 13 at least includes a first sub-groove 15 and a second sub-groove 16. The first sub-groove 15 is perpendicularly connected to the second sub-groove 16. The first protrusion 23 includes a first sub-protrusion matched with the first sub-groove 15 and a second sub-protrusion matched with the second sub-groove 16 in the buckle manner. The first groove 13 includes the first sub-groove 15 and the second sub-groove 16 arranged at a right angle. The first protrusion 23 correspondingly includes the first sub-protrusion and the second sub-protrusion arranged at the right angle, thereby achieving a good clamping.

In one or more embodiments, the first groove 13 includes the first sub-groove 15, the second sub-groove 16, a third sub-groove 17 and a fourth sub-groove 18 connected in sequence. The first sub-groove 15 is connected to the fourth sub-groove 18. The first sub-groove 15 is parallel to the third sub-groove 17. The second sub-groove 16 is parallel to the fourth sub-groove 18. The first protrusion 23 includes the first sub-protrusion matched with the first sub-groove 15, the second sub-protrusion matched with the second sub-groove 16, a third sub-protrusion matched with the third sub-groove 17 and a fourth sub protrusion matched with, the fourth sub-groove 18 in the buckle manner. The first groove 13 includes square sub-grooves. The sub-grooves are communicated. A protrusion correspondingly includes directional sub-protrusions matched with the square sub-grooves in the buckle manner, thereby achieving a better buckle matching. Two side walls and a bottom surface of the first groove 13 can limit displacement well, preventing the first substrate 10 and the second substrate 20 from being displaced after assembling. The square sub-grooves can be arranged in a non-display region of the first substrate 10 and can also be arranged around a display region to save the space.

Figure 6:
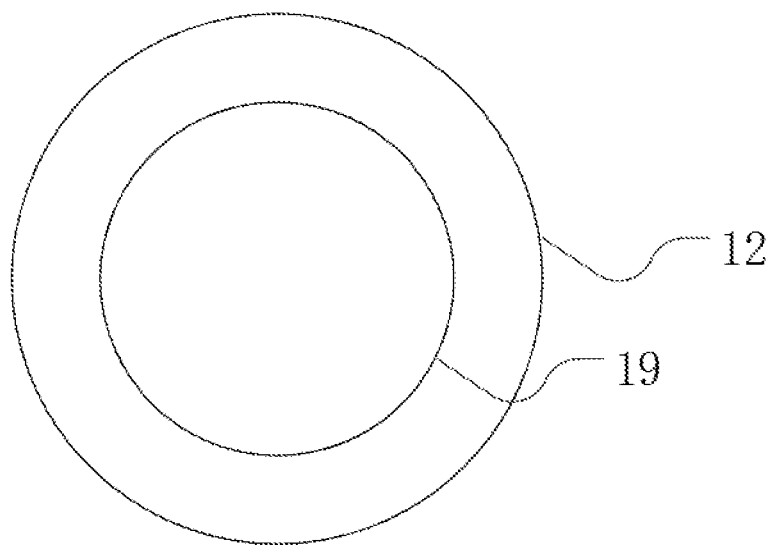
FIG. 6 is another schematic diagram of a first buckle portion and a first mark according an embodiment of the present application.

As shown in FIG. 1 and FIG. 6, the display panel in the embodiments of FIG. 1 and FIG. 6 includes a first substrate 10 including a first buckle portion 11, and a second substrate 20 arranged opposite to the first substrate 10, and a second buckle portion 21 matched with the first buckle portion 11 in a buckle manner is disposed on the second substrate. The first buckle portion 11 matched in the buckle manner is disposed on the first substrate 10, and the second buckle portion 21 matched in the buckle manner are disposed on the second substrate 20. Since the first buckle portion 11 and the second buckle portion 21 can be matched with each other in the buckle manner, the first substrate 10 and the second substrate 20 can be prevented from being displaced in the assembling process of the assembly machine in the panel manufacturing process, thereby preventing the panel from leaking light or scrapping and other bad conditions, improving the yield of the panel, and reducing the production cost. The first buckle portion 11 and the second buckle portion 21 are arranged, preventing the first substrate 10 and the second substrate 20 from being displaced after assembling without increasing costs in the manufacturing process.

In one or more embodiments, first marks 12 are arranged around the first buckle portion 11. Second marks 22 are arranged around the second buckle portion 21. The first marks 12 and the second marks 22 are arranged around the first buckle portion 11 and the second buckle portion 21. The amount of deformation of the first substrate 10 and the second substrate 20 in a former factory can be monitored via the first marks 12 and the second marks 22, thereby facilitating to add and correct the manufacturing process.

In one or more embodiments, the first buckle portion 11 includes a first groove 13. The second buckle portion 21 includes a first protrusion 23 matched with the first groove 13 in the buckle manner. The first groove 13 is easily matched and fixed with the first protrusion 23 in the buckle manner, and change in the substrate 10 and the second substrate 20 is small.

In one or more embodiments, the depth of the first groove 13 is greater than height of the first protrusion 23. The depth of the first groove 13 is greater than the height of the first protrusion 23, forming buckle through matching.

In one or more embodiments, the first groove 13 includes an annular sub-groove 19. The first protrusion 23 includes an annular sub-protrusion matched with the annular groove 19 in the buckle manner. The annular sub-groove 19 of the first groove 13 is matched with the annular sub-protrusion of the first protrusion 23 in the buckle manner without a right angle, thereby achieving the same clamping at any angle.

Figure 7:
FIG. 7 is a schematic diagram of a first substrate according to an embodiment of the present application.
Figure 8:
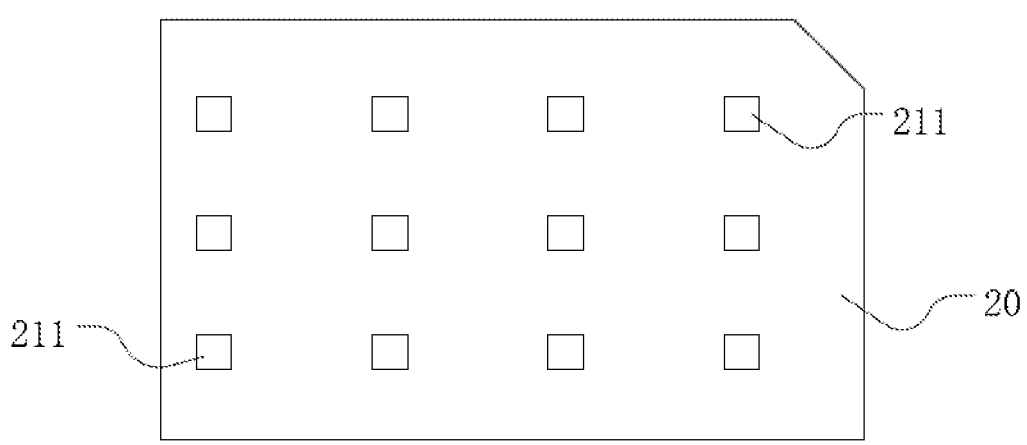
FIG. 8 is a schematic diagram of a second substrate according to an embodiment of the present application.
Figure 9:
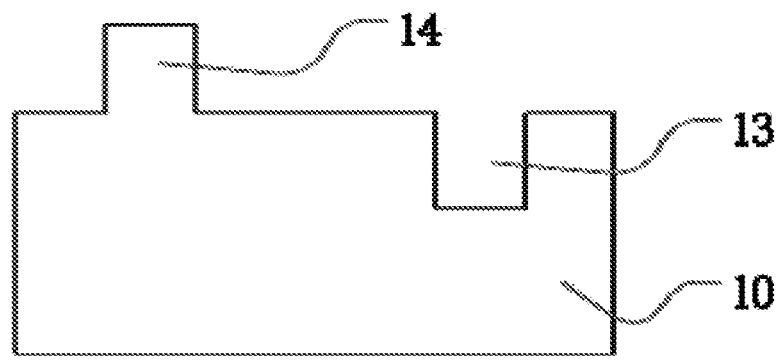
FIG. 9 is a schematic cross-sectional view of a first buckle portion according to an embodiment of the present application.

As shown in FIG. 1, FIG. 7 and FIG. 8, the display panel in the embodiments of FIG. 1, FIG. 7 and FIG. 8 includes a first substrate 10 including a first buckle portion 11, and a second substrate 20 arranged opposite to the first substrate 10, where a second buckle portion 21 matched with the first buckle portion 11 in a buckle manner is disposed on the second substrate 20. The first buckle portion 11 matched in the buckle manner is disposed on the first substrate 10, and the second buckle portion 21 matched in the buckle manner is disposed on the second substrate 20. Since the first buckle portion 11 and the second buckle portion 21 can be matched with each other in the buckle manner, the first substrate 10 and the second substrate 20 can be prevented from being displaced in the assembling process of the assembly machine in the panel manufacturing process, thereby preventing the panel from leaking light or scrapping and other bad conditions, improving the yield of the panel, and reducing the production costs. The first buckle portion 11 and the second buckle portion 21 are arranged, preventing the first substrate 10 and the second substrate 20 from being displaced after assembling without increasing costs in the manufacturing process.

In one or more embodiments, the first buckle portion 11 includes a plurality of first sub-buckle portions 111. The plurality of first sub-buckle portions 111 are spacedly arranged on the non-display region of the first substrate 10. The second buckle portion 21 includes a plurality of second sub-buckle portions 211. The second sub-buckle portions 211 corresponding to the first sub-buckle portions 111 are spacedly arranged on the second substrate 20. The plurality of first sub-buckle portions 111 are spacedly arranged on the non-display region of the first substrate 10 and can be arranged according to specific conditions of the first substrate 10, thereby effectively utilizing the space and improving the fixing effect. The plurality of first sub-buckle portions 111 can be configured in the same size so as to be convenient for manufacture. The plurality of first sub-buckle portions 111 can also be configured in different sizes so as to be easily arranged at different positions of the first substrate 10.

In one or more embodiments, the first buckle portion 11 is arranged on a side edge of the first substrate 10. The second buckle portion 21 corresponding to the first buckle portion 11 is arranged on the side edge of the second substrate 20. The first buckle portion 11 is arranged on the side edge of the first substrate 10, thereby facilitating manufacture, not affecting an internal region of the first substrate 10, and reducing an influence on the first substrate 10.

As shown in FIG. 1, FIG. 2, FIG. 4, FIG. 7 and FIG. 8, the display panel in the embodiments of FIG. 1, FIG. 2, FIG. 4, FIG. 7 and FIG. 8 includes a first substrate 10 including a first buckle portion 11, and a second substrate 20 arranged opposite to the first substrate 10, where a second buckle portion 21 matched with the first buckle portion 11 in a buckle manner is disposed on the second substrate. The first buckle portion 11 matched in the buckle manner is arranged on the first substrate 10, and the second buckle portion 21 matched in the buckle manner is arranged on the second substrate 20. Since the first buckle portion 11 and the second buckle portion 21 can be matched with each other in the buckle manner, the first substrate 10 and the second substrate 20 can be prevented from being displaced in the assembling process of the assembly machine in the panel manufacturing process, thereby preventing the panel from leaking light or scrapping and other bad conditions, improving the yield of the panel, and reducing the production costs. The first buckle portion 11 and the second buckle portion 21 are arranged, preventing the first substrate 10 and the second substrate 20 from being displaced after assembling without increasing costs in the manufacturing process.

In one or more embodiments, the first marks 12 are arranged around the first buckle portion 11. Second marks 22 are arranged around the second buckle portion 21. The first marks 12 and the second marks 22 are arranged around the first buckle portion 11 and the second buckle portion 21. The amount of deformation of the first substrate 10 and the second substrate 20 in a former factory be monitored via the first marks 12 and the second marks 22, thereby facilitating to add and correct the manufacturing process.

In one or more embodiments, the first buckle portion 11 includes a plurality of first sub-buckle portions 111. The plurality of first sub-buckle portions 111 are spacedly disposed on the non-display region of the first substrate 10. The second buckle portion 21 includes a plurality of second sub-buckle portions 211. The second sub-buckle portions 211 corresponding to the first sub-buckle portions 111 are spacedly disposed on the second substrate 20. The plurality of first sub-buckle portions 111 are spacedly disposed on the non-display region of the first substrate 10 and can be arranged according to specific conditions of the first substrate 10, thereby effectively utilizing the space and improving the fixing effect. The plurality of first sub-buckle portions 111 can be configured in the same size so as to be convenient for manufacture. The plurality of first sub-buckle portions 111 can also be configured in different sizes so as to be easily arranged at different positions of the first substrate 10. The arrangement of the first sub-buckle portions 111 on the first substrate 10 can be adjusted as needed. The arrangement of the second sub-buckle portions 211 on the second substrate 20 can be adjusted as needed.

In one or more embodiments, the first buckle portion 11 is disposed on a side edge of the first substrate 10. The second buckle portion 21 corresponding to the first buckle portion 11 is disposed on the side edge of the second substrate 20. The first buckle portion 11 is disposed on the side edge of the first substrate 10, thereby facilitating manufacture, not affecting an internal region of the first substrate 10, and reducing the influence on the first substrate 10.

As shown in FIG. 1, FIG. 2, FIG. 4 and FIG. 9, the display panel in the embodiments of FIG. 1, FIG. 2, FIG. 4 and FIG. 9 includes a first substrate 10 including a first buckle portion 11, and a second substrate 20 arranged opposite to the first substrate 10, where a second buckle portion 21 matched with the first buckle portion 11 in a buckle manner is disposed on the second substrate 20. The first buckle portion 11 matched in the buckle manner is disposed on the first substrate 10, and the second buckle portion 21 matched in the buckle manner is disposed on the second substrate 20. Since the first buckle portion 11 and the second buckle portion 21 can be matched with each other in the buckle manner, the first substrate 10 and the second substrate 20 can be prevented from being displaced in the assembling process of the assembly machine in the panel manufacturing process, thereby preventing the panel from leaking light or scrapping and other bad conditions, improving the yield of the panel, and reducing the production costs. The first buckle portion 11 and the second buckle portion 21 are arranged, preventing the first substrate 10 and the second substrate 20 from being displaced after assembling without increasing costs in the manufacturing process.

In one or more embodiments, the first marks 12 are arranged around the first buckle portion 11. Second marks 22 are arranged around the second buckle portion 21. The first marks 12 and the second marks 22 are arranged around the first buckle portion 11 and the second buckle portion 21. The amount of deformation of the first substrate 10 and the second substrate 20 in a former factory can be monitored via the first marks 12 and the second marks 22, thereby facilitating to add and correct the manufacturing process.

In one or more embodiments, the first buckle portion 11 includes a first groove 13. The second buckle portion 21 includes a first protrusion 23 matched with the first groove 13 in the buckle manner. The first buckle portion 11 further includes a second protrusion 14. The second buckle portion 21 includes a second groove matched with the second protrusion 14 in the buckle manner. The first groove 13 and the second protrusion 14 are disposed on the first substrate 10. The first protrusion 23 and the second groove are disposed on the second substrate 20. The first groove 13 is matched with the first protrusion 23 in the buckle manner. The second groove is matched with the second protrusion 14 in the buckle manner, thereby achieving a better fixing.

In one or more embodiments, the depth of the first groove 13 is greater than height of the first protrusion 23. The depth of the first groove 13 is greater than the height of the first protrusion 23, forming buckle through matching. The depth of the second groove is greater than the height of the second protrusion 14. The depth of the second groove is greater than the height of the second protrusion 14, forming the buckle through matching.

In the above embodiments, the first buckle portion and the second buckle portion as well as the first marks and the second marks are formed by PHT and etching after MASK design, and are realized by pairing the first substrate and the second substrate.

In the above embodiments, the first substrate is a TFT substrate, and the second substrate is the CF substrate. Optionally, the first substrate can also be the CF substrate, and the second substrate is the TFT substrate. The above embodiments, the first substrate and the second substrate may be made of glass, plastics, and the like. The display panel includes a liquid crystal panel, an OLED panel, a curved panel, a plasma panel, and the like. The liquid crystal panel, taken for example, includes the TFT substrate and the CF substrate. The TFT substrate is arranged opposite to the CF substrate. A liquid crystal and a photo spacer (PS) are positioned between the TFT substrate and the CF substrate. A thin film transistor (TFT) is disposed on the TFT substrate. A color filter layer is disposed on the CF substrate. The color filter substrate may include a TFT array. A color filter and the TFT array may be formed on the same substrate. The array may substantially include the color filter layer. The display panel in the present application may be a curved panel.

The above are detailed descriptions of the present application in conjunction with the specific optional embodiments. However, the concrete implementation of the present application shall not be considered to be only limited to these descriptions. For those ordinary skilled in the art to which the present application belongs, several simple deductions or replacements may be made without departing from the conception of the present application, all of which shall be considered to belong to the protection scope of the present application.

What is claimed is:

1. A display panel, comprising:
    a first substrate comprises a first buckle portion; and
    a second substrate arranged opposite to the first substrate, wherein a second buckle portion matched with the first buckle portion in a buckle manner is disposed on the second substrate;
    wherein a first marks are arranged around the first buckle portion; and a second marks matched with the first marks are arranged around the second buckle portion;
    wherein the first buckle portion comprises a first groove; and the second buckle portion comprises a first protrusion matched with the first groove in the buckle manner; and depth of the first groove is greater than height of the first protrusion, a free end surface of the first protrusion is spaced from the bottom surface of the first groove;
    wherein the first groove comprises a first sub-groove and a second sub-groove; and the first sub-groove is perpendicularly connected to the second sub-groove; and the first protrusion comprises a first sub-protrusion matched with the first sub-groove in the buckle manner and a second sub-protrusion matched with the second sub-groove in the buckle manner;
    wherein the first groove comprises the first sub-groove, the second sub-groove, a third sub-groove and a fourth sub-groove connected in sequence; and the first sub-groove is connected to the fourth sub-groove; and the first sub-groove is parallel to the third sub-groove; and the second sub-groove is parallel to the fourth sub-groove;
    wherein the first protrusion comprises the first sub-protrusion matched with the first sub-groove in the buckle manner, the second sub-protrusion matched with the second sub-groove in the buckle manner, a third sub-protrusion matched with the third sub-groove in the buckle manner and a fourth sub-protrusion matched with the fourth sub-groove in the buckle manner;
    wherein the first buckle portion comprises a plurality of first sub-buckle portions; and the plurality of first sub-buckle portions are spacedly disposed on a non-display region of the first substrate;
    wherein the second buckle portion comprises a plurality of second sub-buckle portions; and the plurality of second sub-buckle portions corresponding to the first sub-buckle portions are spacedly disposed on the second substrate;
    wherein the first buckle portion is disposed on a side edge of the first substrate; and the second buckle portion is disposed on the side edge of the second substrate in correspondence with the first buckle portion.

2. The display panel accordingly to claim 1, wherein the first groove is formed and depressed from a surface of the first substrate to a center portion of the first substrate, the second protrusion of the first buckle portion extend from the surface of the first substrate to the second substrate, wherein the second groove is formed and depressed from a surface of the second substrate to a center portion of the second substrate, the first protrusion of the second buckle portion extend from the surface of the second substrate to the first substrate.

3. A display panel, comprising:
    a first substrate comprises a first buckle portion; and a second substrate arranged opposite to the first substrate, wherein a second buckle portion matched with the first buckle portion in a buckle manner is disposed on the second substrate, wherein the first buckle portion comprises a first groove; and the second buckle portion comprises a first protrusion matched with the first groove in the buckle manner, wherein depth of the first groove is greater than height of the first protrusion, and a free end surface of the first protrusion is spaced from the bottom surface of the first groove.

4. The display panel according to claim 3, wherein first marks are arranged around the first buckle portion; and second marks matched with the first marks are arranged around the second buckle portion.

5. The display panel according to claim 3, wherein the first groove comprises a first sub-groove and a second sub-groove; the first sub-groove is perpendicularly connected to the second sub-groove; and the first protrusion comprises a first sub-protrusion matched with the first sub-groove in the buckle manner and a second sub-protrusion matched with the second sub-groove in the buckle manner.

6. The display panel according to claim 3, wherein the first groove comprises the first sub-groove, the second sub-groove, a third sub-groove and a fourth sub-groove connected in sequence; and the first sub-groove is connected to the fourth sub-groove; and the first sub-groove is parallel to the third sub-groove; and the second sub-groove is parallel to the fourth sub-groove;
wherein the first protrusion comprises the first sub-protrusion matched with the first sub-groove in the buckle mariner, the second sub-protrusion matched with the second sub-groove in the buckle manner, a third sub-protrusion matched with the third sub-groove in the buckle manner and a fourth sub-protrusion matched with the fourth sub-groove in the buckle manner.

7. The display panel according to claim 3, wherein the first groove comprises an annular sub-groove; and the first protrusion comprises an annular sub-protrusion matched with the annular sub-groove in the buckle manner.

8. The display panel according to claim 3, wherein the first buckle portion comprises a plurality of first sub-buckle portions; and the plurality of first sub-buckle portions are spacedly disposed on a non-display region of the first substrate;
wherein the second buckle portion comprises a plurality of second sub-buckle portions; and the plurality of second sub-buckle portions corresponding to the first sub-buckle portions are spacedly disposed on the second substrate.

9. The display panel according to claim 8, wherein there are twelve first sub-buckle portions, ten first sub-buckle portions are arranged along four side edges of the first substrate, and the other two first sub-buckle portions are arranged on the first substrate and surrounded by the ten first sub-buckle portions, there are twelve second sub-buckle portions, ten second sub-buckle portions are arranged along four side edges of the second substrate, and the other two second sub-buckle portions are arranged on the second substrate and surrounded by the ten second sub-buckle portions, and one corner of the second substrate define a bevel edge to form a notch.

10. The display panel according to claim 3, wherein the first buckle portion is disposed on a side edge of the first substrate; and the second buckle portion corresponding to the first buckle portion is disposed on the side edge of the second substrate.

11. The display panel according to claim 3, wherein the first buckle portion comprises a first groove; and the second buckle portion comprises a first protrusion matched with the first groove in the buckle manner;
wherein the first buckle portion further comprises a second protrusion; and the second buckle portion comprises a second groove matched with the second protrusion in the buckle manner.

12. The display panel accordingly to claim 11, wherein the first groove is formed and depressed from a surface of the first substrate to a center portion of the first substrate, the second protrusion of the first buckle portion extend from the surface of the first substrate to the second substrate, wherein the second groove is formed and depressed from a surface of the second substrate to a center portion of the second substrate, the first protrusion of the second buckle portion extend from the surface of the second substrate to the first substrate.

13. The display panel according to claim 3, wherein the first substrate is an array substrate, and the second substrate is a color film substrate.

14. The display panel according to claim 3, wherein the material of the first substrate and the second substrate is glass or plastic.

15. A liquid crystal display apparatus comprises a display panel comprising:
a first substrate including a first buckle portion; and
a second substrate arranged opposite to the first substrate, wherein a second buckle portion matched with the first buckle portion in a buckle manner is disposed on the second substrate, wherein the first buckle portion comprises a first groove; and the second buckle portion comprises a first protrusion, matched with the first groove in the buckle manner, wherein depth of the first groove is greater than a height of the first protrusion, and a free end surface of the first protrusion is spaced from the bottom surface of the first groove.

16. The liquid crystal display apparatus according to claim 15, wherein a first mark is arranged around the first buckle portion, and a second mark matched with the first mark is arranged around the second buckle portion.

17. The liquid crystal display apparatus according to claim 15, wherein the first groove comprises a first sub-groove and a second sub-groove; and the first sub-groove is perpendicularly connected to the second sub-groove; and the first protrusion comprises a first sub-protrusion matched with the first sub-groove in the buckle manner and a second sub-protrusion matched with the second sub-groove in the buckle manner.

18. The liquid crystal display apparatus accordingly to claim 17, wherein the first groove is formed and depressed from a surface of the first substrate to a center portion of the first substrate, the second protrusion of the first buckle portion extend from the surface of the first substrate to the second substrate, wherein the second groove is formed and depressed from a surface of the second substrate to a center portion of the second substrate, the first protrusion of the second buckle portion extend from the surface of the second substrate to the first substrate.

19. The liquid crystal display apparatus according to claim 15, wherein the first groove comprises the first sub-groove, the second sub-groove, a third sub-groove and a fourth sub-groove connected in sequence; and the first sub-groove is connected to the fourth sub-groove; and the first sub-groove is parallel to the third sub-groove; and the second sub-groove is parallel to the fourth sub-groove;

wherein the first protrusion comprises the first sub-protrusion matched with the first sub-groove in the buckle manner, the second sub-protrusion matched with the second sub-groove in the buckkle manner, a third sub-protrusion matched with the third sub-groove in the buckle manner and a fourth sub-protrusion matched with the fourth sub-groove in the buckle manner.

20. The liquid crystal display apparatus according to claim 15, wherein the first groove comprises an annular sub-groove; and the first protrusion comprises an annular sub-protrusion matched with the annular sub-groove in the buckle manner.

* * * * *